United States Patent [19]

Even-Nur et al.

[11] Patent Number: 5,307,624
[45] Date of Patent: May 3, 1994

[54] VARIABLE AREA BYPASS VALVE ASSEMBLY

[75] Inventors: Michael Even-Nur, Cincinnati; Carl J. Hoffmann, Jr., West Chester; Robert H. Kraimer, West Chester, all of Ohio

[73] Assignee: General Electric Company, Cincinnati, Ohio

[21] Appl. No.: 504,380

[22] Filed: Apr. 4, 1990

[51] Int. Cl.⁵ .............................................. F62K 3/02
[52] U.S. Cl. ..................................... 60/226.3; 60/262
[58] Field of Search ............... 60/226.1, 226.3, 248, 60/262, 264, 266

[56] References Cited

U.S. PATENT DOCUMENTS

| | | | |
|---|---|---|---|
| 3,579,993 | 5/1971 | Tanner | 60/262 |
| 4,054,030 | 10/1977 | Pedersen | 60/262 |
| 4,064,692 | 12/1977 | Johnson et al. | 60/261 |
| 4,068,471 | 1/1978 | Simmons | 60/262 |
| 4,069,661 | 1/1978 | Rundell et al. | 60/204 |
| 4,072,008 | 2/1978 | Kenworthy et al. | 60/261 |
| 4,085,583 | 4/1978 | Klees | 60/204 |
| 4,151,714 | 5/1979 | Scrace | 60/226.3 |
| 4,175,384 | 11/1979 | Wagenknecht et al. | 60/226.3 |
| 4,222,233 | 9/1980 | Johnson et al. | 60/225 |
| 4,261,686 | 4/1981 | Weiler | 415/151 |
| 4,294,068 | 10/1981 | Klees | 60/204 |
| 4,390,318 | 6/1983 | Weiler | 415/145 |
| 4,409,788 | 10/1983 | Nash et al. | 60/226.3 |
| 4,813,229 | 3/1989 | Simmons | 60/204 |
| 5,136,840 | 8/1992 | Nash | 60/226.3 |

FOREIGN PATENT DOCUMENTS

| | | | |
|---|---|---|---|
| 2508551 | 12/1982 | France | 60/262 |
| 924331 | 4/1963 | United Kingdom | 60/262 |

*Primary Examiner*—Michael J. Carone
*Attorney, Agent, or Firm*—Jerome C. Squillaro; David L. Narciso

[57] ABSTRACT

A bypass valve assembly includes an outer casing and a spaced outer liner defining an annular bypass channel for channeling bypass air. The outer liner includes a plurality of circumferentially spaced slots around which are positioned an annular valve body. The valve body is positionable from a closed position substantially blocking bypass airflow into the slots to an open position uncovering the slots. Positioning means rotates and translates the valve body over the outer liner for covering and uncovering the slots.

20 Claims, 2 Drawing Sheets

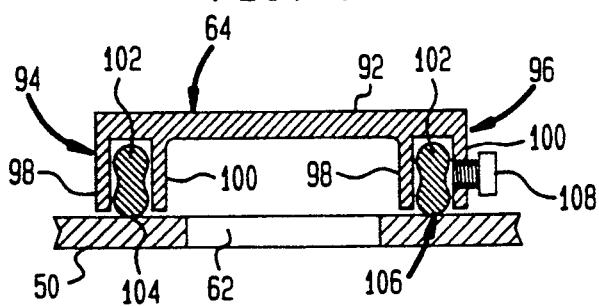
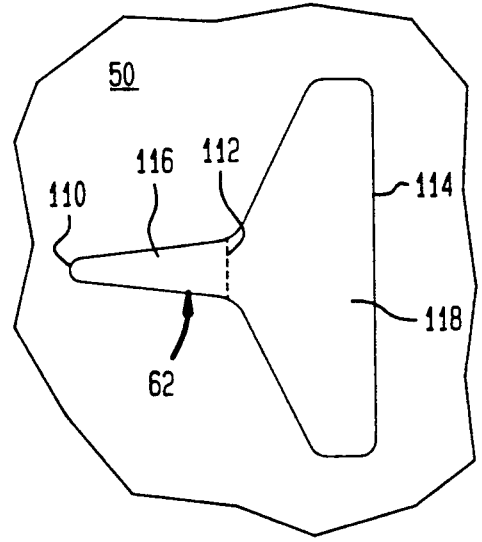
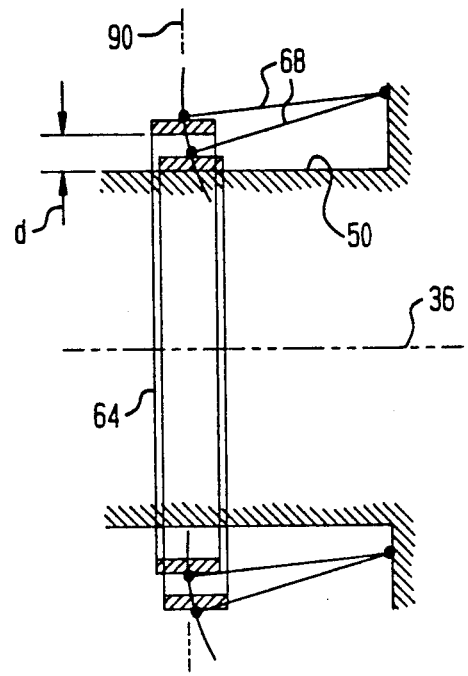
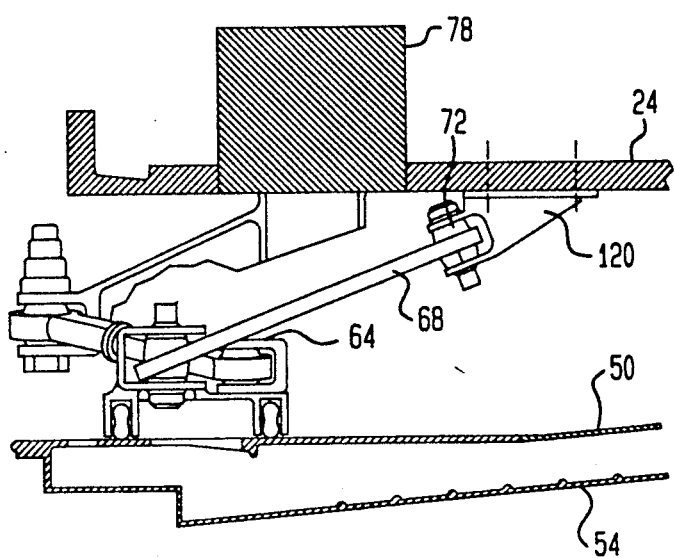

VARIABLE AREA BYPASS VALVE ASSEMBLY

This invention was made with Government support under contract F33657-83-C-0281 awarded by the Department of the Air Force. The Government has certain rights in this invention.

TECHNICAL FIELD

The present invention relates generally to augmented, turbofan gas turbine engines, and, more specifically, to variable area bypass injector valve assemblies.

BACKGROUND ART

In conventional turbofan gas turbine engines having a core engine, bypass duct and an augmentor, or afterburner, variable are bypass injectors (VABIs) are sometimes utilized to unload the engine fan at certain operating conditions for reducing back pressure and thereby maintaining desirable fan stall margin. The VABI system also provides a method for adjusting the engine cycle. For example, a conventional rear VABI may be used and is located between the core engine and the augmentor for selectively diverting some of the bypass airflow being channeled through the bypass duct into the core stream discharged from the core engine. The augmentor includes a bypass channel surrounding an augmentor outer liner which is disposed in flow communication with the bypass duct surrounding the core engine. Disposed radially inwardly of the outer liner is an inner liner which defines the augmentor combustion zone and bounds the combustion gases flowable therethrough. Disposed at the downstream end of the augmentor is a conventional variable area exhaust nozzle.

The bypass air channeled through the bypass duct surrounding the core engine, is channeled, in part, through the augmentor bypass channel and to the exhaust nozzle for providing cooling air to the exhaust nozzle. A portion of the bypass air is conventionally channeled between the augmentor outer and inner liners to provide cooling air to the inner liner. The inner liner may include conventional film cooling holes, or may be imperforate and conventionally cooled by convection from the bypass air channeled along its outer surface. A generally constant pressure drop across the augmentor outer liner is typically provided during the various modes of operation of the engine to ensure that acceptable cooling of the exhaust nozzle is obtained.

The prior art includes numerous types of valve assemblies for channeling bypass air in a gas turbine engine. The assemblies may include hinged flap valves or translatable ring valves for covering and uncovering apertures for controlling bypass flow. Various types of linkages are employed typically actuated by a plurality of actuators for positioning the valves. For obtaining acceptable operation of the valve assemblies, friction forces, flexibility, and operating clearances associated with the elements of the valve assemblies must be accommodated for providing control of the bypass air flow.

The prior art bypass valve assemblies vary in degree of complexity, weight, actuation force requirements and performance.

OBJECTS OF THE INVENTION

Accordingly, one object of the present invention is to provide a new and improved bypass valve assembly.

Another object of the present invention is to provide a bypass valve assembly including a new and improved actuation system.

Another object of the present invention is to provide a bypass valve assembly which is relatively simple and lightweight.

Another object of the present invention is to provide a bypass valve assembly having reduced friction in operation and thereby requiring reduced actuation forces.

Another object of the present invention is to provide a bypass valve assembly including an annular valve body which is actuated by at least one actuator.

Another object of the present invention is to provide a bypass valve assembly including an annular valve body which is uniformly translatable.

Another object of the present invention is to provide a bypass valve assembly effective for maintaining a generally constant differential pressure across an augmentor outer liner.

DISCLOSURE OF INVENTION

A bypass valve assembly includes an outer casing and a spaced outer liner defining an annular bypass channel for channeling bypass air. The outer liner includes a plurality of circumferentially spaced slots around which are positioned an annular valve body. The valve body is positionable from a closed position substantially blocking bypass airflow into the slots to an open position uncovering the slots. Positioning means rotate and translate the valve body over the outer liner for covering and uncovering the slots.

BRIEF DESCRIPTIONS OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

FIG. 5 is a schematic, sectional representation of the bypass valve assembly illustrated in FIG. 3 disposed about the outer liner.

FIG. 6 is a transverse sectional view of the valve body of the bypass valve assembly illustrated in FIG. 2 taken along line 6—6.

FIG. 7 is a top view of the outer liner 50 enlarged to show details of one of the slots utilized in the bypass valve assembly illustrated for example in FIGS. 4 and 6.

FIG. 8 is a partly sectional view of another embodiment of the bypass valve assembly in accordance with the present invention which is generally similar to the embodiment illustrated in FIG. 3.

MODE(S) FOR CARRYING OUT THE INVENTION

Figure 1:
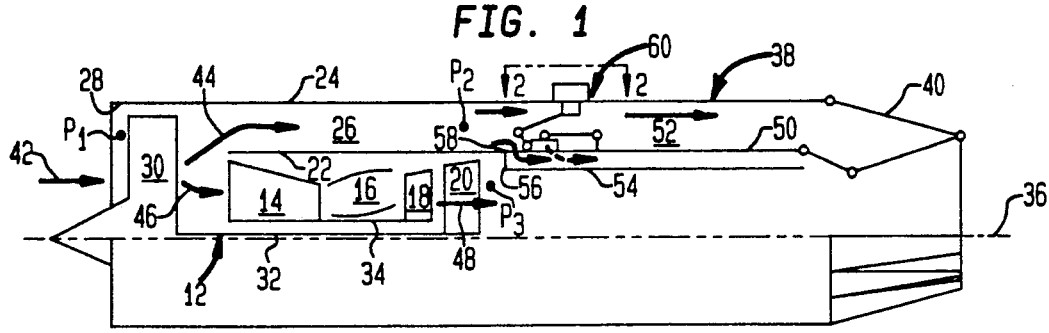
FIG. 1 is a schematic, sectional representation of an augmented gas turbine turbofan engine including a bypass valve assembly in accordance with one embodiment of the present invention.

Illustrated in FIG. 1 is a turbofan augmented gas turbine engine 10 for powering an aircraft. The engine 10 includes a conventional core engine 12 which has in serial flow communication, a high pressure compressor (HPC) 14, a combustor 16, a high pressure turbine (HPT) 18, and a low pressure turbine (LPT) 20. Surrounding the core engine 12 is a conventional annular inner casing 22 which is spaced radially inwardly from a conventional annular outer casing 24 of the engine to define a conventional bypass duct 26.

Disposed at a conventional annular inlet 28 of the engine is a conventional fan 30 which is powered by the LPT 20 through a conventional first shaft 32. The HPC 14 is powered by the HPT 18 through a conventional second shaft 34 disposed concentrically about the first shaft 32. The first and second shafts 32 and 34 are disposed coaxially with a longitudinal centerline axis 36 of the engine.

Disposed downstream of the core engine 12 is a conventional augmentor, or afterburner 38, which is in turn, connected to a conventional variable area exhaust nozzle 40. In conventional operation, the engine 10 receives ambient air 42 in the inlet 28, a portion of which is diverted from the HPC 14 into the bypass duct 26 as bypass air 44. The remaining portion of the air 42 is channeled into the HPC 14 as core air 46. The core air 46 is conventionally mixed with fuel and burned for generating a core stream 48 of combustion gases which are discharged from the LPT 20 into the augmentor 38 and discharged from the engine through the nozzle 40.

The augmentor 38 further includes an annular outer liner 50 disposed coaxially with the centerline axis 36 and spaced radially inwardly from the outer casing 24 to define an augmentor bypass channel 52. The bypass channel 52 extends from and is in flow communication with the bypass duct 26 surrounding the core engine 12 for receiving the bypass air 44. Disposed radially inwardly of the outer liner 50 is a conventional inner liner 54 which is conventionally secured to the outer liner 50 at its upstream end 56. A plurality of circumferentially spaced conventional apertures 58 are disposed in the outer liner 50 adjacent to the inner liner upstream end 56 for channeling a portion of the bypass air 44 from the bypass duct 26 to flow into the annulus between liners 50 and 54 and around the inner liner 54 for the cooling thereof. The inner liner 54 may be imperforate and cooled convectively by the bypass air 44, or it may include conventional film cooling apertures for providing enhanced cooling as is conventionally known.

The engine 10 as above described is conventional except for a variable area bypass valve assembly 60 in accordance with the present invention. One embodiment of the assembly 60 is illustrated in more particularity in FIGS. 2, 3 and 4. The assembly 60 includes the annular outer casing 24 and the annular outer liner 50 spaced radially inwardly therefrom to define the bypass channel 52. A plurality of circumferentially spaced and aligned slots 62 are disposed in the outer liner 50. An annular valve body, or housing 64, is slidably disposed around the outer liner 50 and is positionable from a closed position shown in solid lines in FIGS. 2 and 3, and in dashed line in FIG. 4, which substantially blocks flow of the bypass air 44 from the bypass channel 52 into the slots 62. The valve body 64 is positionable from the closed position to an open position fully uncovering the slots 62 for allowing unobstructed flow of the bypass air 44 into the slots 62 as shown in dashed line in FIGS. 2 and 4.

Means 66 for positioning the valve body 64 between the closed and open positions, including intermediate positions therebetween, are provided for rotating and translating the valve body 64 over the outer liner 50. The positioning means 66 includes at least three swing links 68 circumferentially spaced from each other around the outer liner 50 with each swing link 68 having a first end 70 conventionally pivotally connected to the valve body 64, by a spherical bearing for example, and a second end 72 conventionally pivotally connected to at least one of the outer casing 24 and the outer liner 50. In the embodiment illustrated in FIGS. 1-3, the swing link second end 72 is preferably pivotally connected solely to the outer liner 50 by a conventional spherical bearing bolted to a conventional bracket 74 fixedly connected to the outer liner 50. The swing links 68 are sized and positioned as further described hereinbelow for uniformly translating the valve body 64 without tilting, or any appreciable tilting, as the valve body 64 is moved from the closed to open positions and back.

The positioning means 66 further includes means 76 for rotating the valve body 64 about the longitudinal centerline axis 36 so that the swing links 68 translate the valve body 64 for positioning the valve body 64 between the closed and open positions, i.e., from the closed position to the open position and back, and at intermediate positions. In a preferred embodiment, a single, or only one, conventional rotary actuator 78 is used for reducing weight and complexity. The rotary actuator 78 includes a single, or only one, drive link, or bellcrank 80, which is movable, or rotatable, by the rotary actuator 78 in opposite directions for opening and closing the valve body 64.

At least one actuator 78 may be used in accordance with the preferred embodiment of the invention, although more than one actuator may be used in other embodiments. A conventional drive link 82 has a first end 84, such as a spherical rod end, conventionally pivotally connected to the bellcrank 80, and a second end 86, such as a conventional spherical rod end, conventionally pivotally connected to the valve body 64 at a conventional second bracket 88 fixedly connected to the valve body 64 by welding or bolting, for example. The actuator 78 is effective for moving, or rotating, the bellcrank 80 for moving by pushing or pulling the drive link 82 for rotating the valve body 64 in either two directions, i.e., clockwise or counter-clockwise. The actuator 78 is controlled by a conventional control system (not shown) of the engine 10 in a conventional manner.

In the preferred embodiment, the swing links 68 are disposed on an opposite side of the valve body 64 relative to the bellcrank 80 and the driver link 82. However, in other embodiments of the invention, they may be disposed on the same side of the valve body 64 or their positions relative to the valve body 64 may be reversed.

Figure 3:
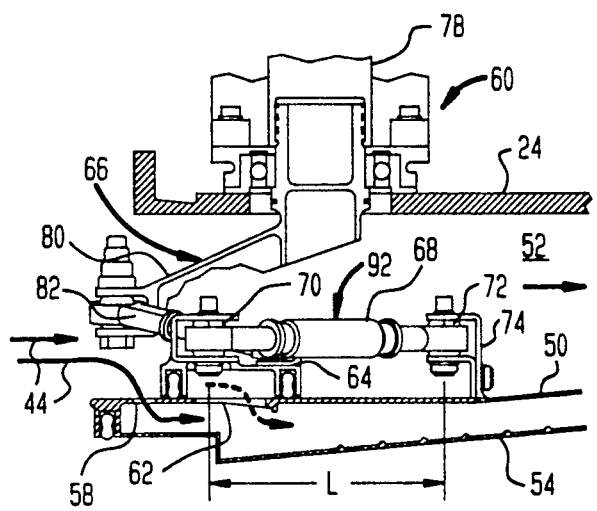
FIG. 3 is a partly sectional view of the bypass valve assembly illustrated in FIG. 2 showing a radially outer portion thereof taken along line 3—3.

As illustrated in FIGS. 3 and 5, the swing links 68 are preferably disposed generally parallel to the outer liner 50 when the valve body 64 is in the closed position. This generally horizontal position of the swing links 64 ensures that when the valve body 64 is rotated by the drive link 82, it is translated generally perpendicular to the longitudinal centerline axis 36 without any, or any appreciate, amount of tilting. Tilting of the valve body 64 during operation can result in increased friction which must be overcome by the actuator 78 and possibly leading to undesirable leaking of the bypass air 44 under the valve body 64 when in the closed or intermediate positions. Since the valve body 64 and the outer liner 50 have relatively large diameters in the engine 10, manufacturing tolerances necessarily result in a radial clearance d between the valve body 64 and the outer casing 50. The radial clearance d may lead to the valve body 64 being positioned eccentric to the outer liner 50 and the longitudinal centerline axis 36 which can result in undesirable tilting of the valve body 64. By mounting the swing link 68 in a horizontal position in the preferred embodiment, tilting is minimized for ensuring relatively smooth actuation of the valve body 64 which reduced amounts of friction.

Furthermore, since the diameters of the valve body 64 and the outer liner 50 are relatively large as above described, the valve body 64 will have a certain amount of flexibility, for example, which will allow for bending of the valve body 64 about its circumference which would thereby vary the clearance d between the valve body 64 and the outer liner 50 about the circumference thereof. Since in the preferred embodiment of the invention, a single actuator 78 and drive link 82 are preferred, the actuation loads, tension and compression, provided by the drive link 82 to the valve body 64 occur at a single point on the valve body 64. In order to more uniformly distribute the applied single load from the drive link 82 to the valve body 64, more than three swing links are preferred, and in the exemplary embodiment of the invention, six swing links 68 are preferred which are equidistantly spaced from each other around the outer liner 60 at a 60° spacing. Since three swing links 68 define a single plane 90, as illustrated in FIG. 5, any additional swing links greater than three are preferably adjustable length swing links so that their lengths may be easily adjusted for connecting the links 68 to the valve body 64 for defining the single plane 90. In the preferred embodiment, three fixed length swing links are used and three adjustable length swing links 68 are respectively positioned between the fixed length swing links. The six swing links 68 may be sized to extend to the single plane 90 of the valve body 64 so that the valve body 64 translates uniformly without tilting or swing link induced distortion. Accordingly, in order to ensure uniform translation of the valve body 64 and reduced distortion during movement, the swing links 68 are sized to have uniform, or equal lengths L. FIG. 3 illustrates one of the adjustable length swing links 68 which includes a conventional turnbuckle 92 at its center region which is threadingly engaged between the first and second ends 70 and 72 for controlling the length L of the swing link 68.

Figure 2:
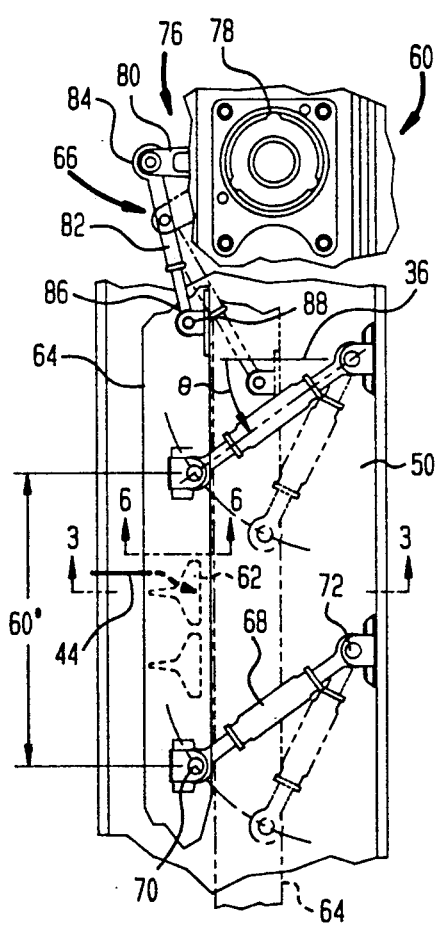
FIG. 2 is a top view of portions of the annular bypass valve assembly illustrated in FIG. 1 taken along line 2—2.

Illustrated in FIG. 2 is a preferred angular positioning of the swing links 68 relative to the longitudinal centerline axis 36 and the circumference of the outer liner 50. The swing links 68 are positioned at uniform, or equal, position angles θ relative to the longitudinal axis 36 and are sized to have uniform lengths L as above described. The position angles θ are preferably acute angles, which are also preferably no greater than about 40° maximum during movement of the valve body 64. With the swing links 68 having the preferred initial position generally horizontal to the outer liner 50 in the closed position as illustrated in FIG. 3, it is also preferred that the corresponding position angle θ is about 40° and ranges up to about 65° as the valve body 64 is positioned from the closed position to the open position as illustrated in FIG. 2. As the valve body 64 rotates from the closed position to the open position, the swing links 68 must necessarily follow and the first ends 70 thereof move radially inwardly relative to the second end 72 thus slightly tilting the swing link 68 away from its horizontal position as shown, for example, in FIG. 5. Minimum amounts of tilting of the swing links 68 is preferred for most efficient operation of the assembly 60 as described above.

Illustrated in more particularity in FIG. 6 is a cross section of the valve body 64 in accordance with a preferred embodiment. Other profiles of the valve body 64 may be utilized for providing effective sealing of the valve body 64 over the slots 62, however the generally U-shaped valve body 64 illustrated in FIGS. 6 is preferred. The valve body 64 includes an annular base 92 and first and second legs 94 and 96, respectively, extending from the base 92. Each of the legs is U-shaped and has first and second sidewalls 98 and 100, respectively. The legs are spaced apart so that the valve body 64 fully covers the slots 62 when in the closed position as illustrated for example in FIGS. 4 and 6. In addition, the leg spacing is preferably selected to minimize tilting of the valve body 64 when translating across the surface of the outer liner 50. An annular seal member 102 is disposed in each of the legs 94 and 96 between the sidewalls 98 and 100 and has a contact edge 104 extending outwardly from between the sidewalls 98 and 100 to contact the outer liner 50 for providing a seal 106 therewith. The seal members 102 are preferably made of a metal such as, for example, INCO 718 and each includes a single split along the circumference, such as in a conventional piston ring, for allowing expansion of the seal members 102. As illustrated in FIG. 6, a plurality of screws 108 (one shown) may be disposed in the sidewalls 100 so that they may be tightened against the initially expanded seal members 102 for retaining the seal members 102 between the sidewalls 98 and 100 for assembly purposes. The valve body 64 with the seal members 102 so secured may then be easily positioned over the outer liner 50 during assembly without interference therewith by the seal member 102. The screws 108 are then removed from the valve body 68 to allow the seal members 102 to contract and to contact and provide an effective seal against the outer liner 50.

In the preferred embodiment, the seal members 102 are slidably disposed in the legs 94 and 96 and have a generally figure-eight profile for providing radial stiffness and for providing secondary sealing between the seal members 102 and the sidewalls 98 and 100 in the legs. As shown in FIG. 6, the figure-eight seal member 102 may contact the sidewalls 98 and 100 and the base 92 at about five contact points where the arcuate portions of the seal members 102 face the straight portions of the legs 94 and 96.

A metal seal member 102 having a figure-eight profile is preferred for providing radial stiffness in the seal member 102 for resisting bending thereof. Other seal configurations could also be used. Such radial stiffness of the seal member 102 is effective for supporting the valve body 64 over the outer liner 50 which improves centering of the valve body 64 relative to the longitudinal centerline axis 36. The figure-eight shape also provides for weight reduction of the seal members 102 themselves which is significant for the diameters of the seal members 102 which would be utilized in the engine 10. In the preferred embodiment of the valve body 64, the valve body 64 contacts the outer liner 50 along only the two contact edges 104. Since these contact edges 104 are relatively small, friction between the valve body 64 and the outer liner 50 is relatively small. Yet further, since the valve body 64 rotates circumferentially about the outer liner 50, relatively small resisting friction forces act against the valve body 64 thus requiring relatively little actuation force from the actuator 78.

Figure 4:
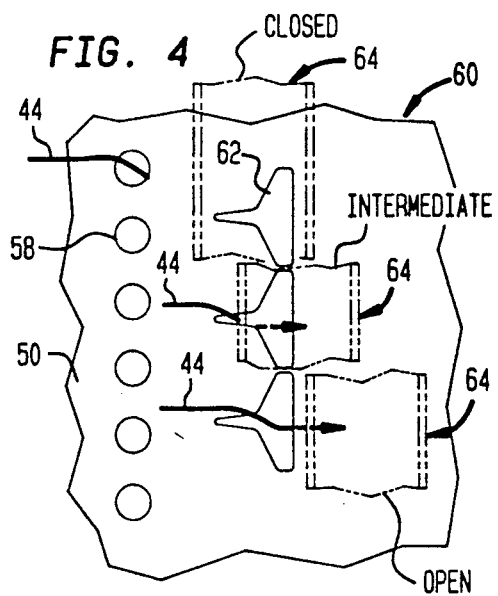
FIG. 4 is an enlarged view of a portion of the bypass valve assembly illustrated in FIG. 2 illustrating an outer liner including bypass air slots therein.

As illustrated in FIG. 4, the valve body 64 is positionable at intermediate open positions between the closed position and the open, i.e., fully open, position for varying the amount of bypass flow 44 channeled through the slots 62, and the slots 62 are shaped so that a substantially constant pressure drop radially across the outer liner 50 is maintained at the intermediate and open positions. More specifically, the inlet air 42 has a first pressure $P_1$, the bypass air 44 discharged from the bypass duct 26 into the assembly 60 has a second pressure $P_2$, and the core stream 48 downstream of the LPT 20 has a third pressure $P_3$ as illustrated in FIG. 1. The differential pressure $P_2 - P_3$ is preferably maintained relatively constant through various modes of operation of the engine 10 to ensure that acceptable amounts of the bypass air 44 are channeled through the bypass channel 52 for conventionally cooling the exhaust nozzle 40. As is conventionally known, the fan 30 must be unloaded at certain operating conditions by diverting a portion of the bypass air 44 from the duct 26 and channel 52 to inside the outer liner 50 for reducing back pressure represented by $P_2 - P_1$, for maintaining acceptable fan stall margin. Accordingly, the valve body 64 is predeterminedly positioned from the closed position through intermediate positions to the open position in response to the back pressure $P_2 - P_1$ in accordance with conventional practice.

In order to ensure that a substantially constant pressure drop $P_2 - P_3$ across the outer liner 50 occurs through the various positions of the valve body 64, the slots 62 have a preferred generally T-shaped profile. As illustrated more particularly in FIG. 7, each of the slots 62 includes an upstream end 110, an intermediate section 112 and a downstream end 114. The slot 62 also includes an upstream portion 116 which extends from the upstream end 110 to the intermediate section 112 which has a flow area increasing at a generally first rate as the valve body 64 is moved downstream from the closed position (see also FIG. 4) to uncover the portion 116. The flow area in the upstream portion 116 increases as the valve body 64 moves in stages from the upstream end 110 to the intermediate section 112 of the slot 62. The slot 62 also includes a downstream portion 118 extending from the intermediate section 112 to the downstream end 118 which has a flow area increasing at a second rate which is greater than the first rate as the valve body 64 is moved downstream from the intermediate section 112 to the downstream end 114 uncovering also the downstream portion 118 in stages. The flow area of the downstream portion 118 increases as the valve body 64 moves in stages from the intermediate section 112 to a maximum value at the downstream end 114.

Although the T-shaped profile of the slots 62 as above described is preferred for the preferred embodiment of the invention, other profiles may be used for other embodiments of the invention.

Illustrated in FIG. 8 is another embodiment of the present invention which is generally similar to the embodiment illustrated in FIG. 3 except that the swing link second ends 72 are pivotally connected solely to the outer casing 24 by a conventional third bracket 120 fixedly secured to the outer casing 24. In this embodiment of the invention, the bracket 120 could be sized for positioning the swing link 68 in a horizontal position, however, as shown in FIG. 8, the swing links 68 may be tilted relative to the outer liner 50, if desired. However, this embodiment would not have the advantage of the embodiment illustrated in FIG. 3 which allows complete assembly of the valve body 64 and swing links 68 to the outer liner 50 before assembly inside the outer casing 24.

While there have been described herein what are considered to be preferred embodiments of the present invention, other modifications of the invention shall be apparent to those skilled in the arts from the teachings herein, and it is, therefore, desired to be secured in the appended claims, all such modifications as fall within the true spirit and scope of the invention.

More specifically, and for example only, although the bypass valve assembly 60 has been disclosed in combination with the augmentor 38, the assembly may be used in other applications wherein flow is to be channeled from one channel through the slots 62 into another channel. Furthermore, although rotary actuators 78 have been disclosed herein, conventional linear actuators and corresponding conventional linkage may also be used for rotating the valve body 64. The valve body 64 may be disposed radially outside an annular member such as the outer liner 50, or in alternate embodiments may be disposed radially inwardly of the outer liner 50 with corresponding modifications made for rotating the valve body 64.

Accordingly, what is desired to be secured by Letters Patent of the United States is the invention as defined and differentiated in the following claims.

We claim:

1. A bypass valve assembly for a gas turbine engine comprising:
    an annular outer casing;
    an annular outer liner spaced radially inwardly from said outer casing to define a bypass channel for channeling bypass air, said outer liner including a plurality of circumferentially spaced slots for channeling said bypass air from said bypass channel to inside said outer liner;
    an annular valve body slidably disposed around said outer liner and positionable from a closed position, substantially blocking flow of said bypass air from said bypass channel into said slots, to an open position uncovering said slots for allowing unobstructed flow of said bypass air into said slots; and
    means for positioning said valve body between said closed and open positions by rotating and translating said valve body over said outer liner, wherein said positioning means comprises:
        three fixed length swing links and three adjustable length swing links circumferentially spaced from each other around said outer liner, each swing link having a first end pivotally connected to said valve body, and a second end pivotally connected to at least one of said outer casing and said outer liner, said swing links being sized and positioned for uniformly translating said valve body without tilting, said adjustable length swing links being adjusted in length to extend to a plane of said valve body defined by said three fixed length swing links; and means for rotating said valve body so that said swing links translate said valve body for positioning said valve body between said closed and open positions.

2. An assembly according to claim 1 wherein said rotating means comprises:
at least one actuator having a moveable driver member;
at least one drive link having a first end pivotally connected to said driver member, and a second end pivotally connected to said valve body; and
wherein said actuator is effective for moving said driver member to move said drive link for rotating said valve body.

3. An assembly according to claim 2 wherein said rotating means includes a single actuator and a single drive link.

4. An assembly according to claim 2 wherein said rotating means actuator is a rotary actuator and said driver member is a bellcrank.

5. An assembly according to claim 2 wherein said swing link second ends are pivotally connected solely to said outer casing.

6. An assembly according to claim 2 wherein said outer liner has a circumference and a longitudinal centerline axis and said swing links are positioned at uniform position angles relative to said circumference and said centerline axis and are sized to have uniform lengths.

7. An assembly according to claim 6 wherein said position angles are acute angles.

8. An assembly according to claim 6 wherein said position angles are no greater than about 65°.

9. An assembly according to claim 6 wherein said position angles range from about 40° to about 65° as said valve body is positioned from closed position to said open position.

10. An assembly according to claim 2 wherein said valve body is positionable at intermediate positions between said closed and open positions for varying said bypass airflow through said slots and said slots are shaped so that a substantially constant pressure drop radially across said outer liner is maintained at said intermediate positions.

11. An assembly according to claim 2 wherein said slots are generally T-shaped and include an upstream end, an intermediate section, a downstream end, an upstream portion extending from said upstream end to said intermediate section and having a flow area increasing at a first rate from said upstream end to said intermediate section, and a downstream portion extending from said intermediate section to said downstream end and having a flow area increasing at a second rate greater than said first rate from said intermediate section to said downstream end.

12. An assembly according to claim 2 wherein:
said rotating means actuator is a rotary actuator and said driver member is a bellcrank;
said swing links comprise three fixed length swing links and three adjustable length swing links equidistantly spaced around said outer liner, said adjustable length swing links being adjusted in length to extend to a plane of said valve body defined by said three fixed length swing links so that said valve body translates uniformly without tilting;
said swing links and said bellcrank are disposed on opposite sides of said valve body, said swing links being disposed generally parallel to said outer liner when said valve body is in said closed position, and said swing link second ends being pivotally connected solely to said outer liner;
said outer liner has a circumference and a longitudinal centerline axis and said swing links are positioned at uniform position angles relative to said circumference and said centerline axis, said position angles ranging from about 40° to about 65° as said valve body is positioned from said closed position to said open position, and said swing links being sized to have uniform lengths;
said valve body is generally U-shaped and includes:
an annular base;
first and second legs extending from said base, each of said legs being U-shaped and having first and second sidewalls, said legs being spaced apart so that said valve body fully covers said slots when in said closed position; and
a seal member slidably disposed in said legs and having a generally figure-eight profile and a contact edge extending outwardly from said side walls to contact said outer liner for providing a seal therewith; and
said slots are generally T-shaped so that a substantially constant pressure drop radially across said outer liner is maintained at intermediate positions of said valve body between said closed and open positions.

13. A bypass valve assembly for a gas turbine engine comprising:
an annular outer casing:
an annular outer liner spaced radially inwardly from said outer casing to define a bypass channel for channeling bypass air, said outer liner including a plurality of circumferentially spaced slots for channeling said bypass air from said bypass channel to inside said outer liner:
an annular valve body slidably disposed around said outer liner and positionable from a closed position, substantially blocking flow of said bypass air from said bypass channel into said slots, to an open position uncovering said slots for allowing unobstructed flow of said bypass air into said slots; and
means for positioning said valve body between said closed and open positions by rotating and translating said valve body over said outer liner, wherein said positioning means comprises:
at least three swing links circumferentially spaced from each other around said outer liner, each swing link having a first end pivotally connected to said valve body, and a second end pivotally connected solely to said outer liner, said swing links being sized and positioned for uniformly translating said valve body; and
means for rotating said valve body so that said swing links translate said valve body for positioning said valve body between said closed and open positions.

14. An assembly according to claim 13 wherein said swing links are disposed generally parallel to said outer liner when said valve body is in said closed position.

15. An assembly according to claim 13 wherein said rotating means comprises:
at least one actuator having a moveable driver member;
at least one drive link having a first end pivotally connected to said driver member, and a second end pivotally connected to said valve body; and wherein said actuator is effective for moving said driver member to move said drive link for rotating said valve body, and further wherein said swing links and said driver member are disposed on opposite sides of said valve body.

16. An assembly according to claim 13 further including three fixed length swing links and three adjustable length swing links, said adjustable length swing links being adjusted in length to extend to a plane of said valve body defined by said three fixed length swing links so that said valve body translates uniformly without tilting.

17. An assembly according to claim 16 wherein said swing links are equidistantly spaced around said outer liner.

18. A bypass valve assembly for a gas turbine engine comprising:
   an annular outer casing;
   an annular outer liner spaced radially inwardly from said outer casing to define a bypass channel for channeling bypass air, said outer liner including a plurality of circumferentially spaced slots for channeling said bypass air from said bypass channel to inside said outer liner:
   an annular valve body slidably disposed around said outer linear and positionable from a closed position, substantially blocking flow of said bypass air from said bypass channel into said slots, to an open position uncovering said slots for allowing unobstructed flow of said bypass air into said slots, wherein said valve body is generally U-shaped and includes:
   an annular base;
   first and second legs extending from said base, each of said legs being U-shaped and having first and second sidewalls, said legs being spaced apart so that said valve body fully covers said slots when in said closed position; and
   a seal member disposed in each of said legs between said sidewalls and having a contact edge extending outwardly from between said sidewalls to contact said outer liner for providing a seal therewith; and
   means for positioning said valve body between said closed and open positions by rotating and translating said valve body over said outer line.

19. An assembly according to claim 18 wherein each of said seal members is annular and includes a split to allow for expansion of said seal member.

20. An assembly according to claim 18 wherein said seal members are slidably disposed in said legs and have a generally figure-eight profile for providing radial stiffness and for providing secondary sealing between said seal members and said sidewalls in said legs.

* * * * *